United States Patent [19]
Johnson

[11] Patent Number: 5,161,057
[45] Date of Patent: Nov. 3, 1992

[54] DISPERSION-COMPENSATED FRESNEL LENS

[76] Inventor: Kenneth C. Johnson, 1215 Brewster Dr., El Cerrito, Calif. 94530

[21] Appl. No.: 537,230

[22] Filed: Jun. 13, 1990

Related U.S. Application Data

[63] Continuation-in-part of Ser. No. 243,419, Sep. 12, 1988, abandoned.

[51] Int. Cl.$^5$ .......................... G02B 5/18; G02B 3/08
[52] U.S. Cl. .................................. 359/566; 359/571; 359/742; 359/565
[58] Field of Search .................. 350/162.16, 162.17, 350/162.2, 162.21, 162.22, 452, 128, 129, 167, 168; 126/438, 440; 359/565, 566, 569, 571, 572, 742

[56] References Cited

U.S. PATENT DOCUMENTS

| | | |
|---|---|---|
| 2,818,765 | 1/1958 | Foster et al. |
| 3,493,287 | 2/1970 | Lohmann et al. |
| 3,718,078 | 2/1973 | Plummer ............................ 350/452 |
| 4,204,881 | 5/1980 | McGren ......................... 350/162.22 |
| 4,298,249 | 11/1981 | Gloor et al. ........................ 350/452 |
| 4,435,041 | 3/1984 | Turok et al. .................. 350/162.22 |
| 4,475,792 | 10/1984 | Sica, Jr. ......................... 350/162.22 |
| 4,484,072 | 11/1984 | Matsumura ................... 350/162.22 |
| 4,637,697 | 1/1987 | Freeman ........................ 350/162.16 |
| 4,895,790 | 1/1990 | Swanson et al. ................. 350/162.2 |
| 4,936,665 | 6/1990 | Whitney ............................. 350/437 |

FOREIGN PATENT DOCUMENTS

| | | | |
|---|---|---|---|
| 0294902 | 12/1988 | European Pat. Off. | |
| 3421705 | 6/1984 | Fed. Rep. of Germany. | |
| 0008536 | 1/1982 | Japan ................................... | 350/128 |
| 0161841 | 10/1982 | Japan .............................. | 350/162.22 |
| 0068701 | 4/1983 | Japan ................................... | 350/620 |
| 0184939 | 10/1983 | Japan ................................... | 350/128 |
| 59-137908 | 8/1984 | Japan. | |
| 0118304 | 5/1987 | Japan ................................... | 350/452 |
| 0706711 | 12/1979 | U.S.S.R. .............................. | 350/168 |

OTHER PUBLICATIONS

Dale A. Burali, G. Michael Morris, John R. Rogers; "Optical Performance of Holographic Kinoforms"; *Applied Optics*; vol. 28, No. 5; Mar. 1989, pp. 976-983.

G. G. Sliusarev; "Optical Systems with Phase Layers"; *Soviet Physics Doklady*; vol. 2, No. 1; Jan.-Feb. 1957, pp. 161-163.

Kenro Miyamoto; "The Phase Fresnel Lens"; *Journal of the Optical Society of America*; vol. 51, No. 1, Jan. 1961; pp. 17-20.

J. A. Jordan et al.; "Kinoform Lenses"; *Applied Optics*; vol. 9, No. 8; Aug. 1970; pp. 1883-1887.

E. M. Kritchman; "Color-Corrected Fresnel Lens for Solar Concentration"; *Optics Letters*; vol. 5, No. 1; 1980; pp. 35-37.

W. A. Kleinhans; "Aberrations of Curved Zone Plates and Fresnel Lenses"; *Applied Optics*; vol. 16, No. 6; 1977; pp. 1701-1704.

A. I. Tudorosvoskii, "An objective with a phase plate", *Optics and Spectroscopy*, vol. 6, No. 2, Feb. 1959, pp. 126-133.

C. H. Chi et al., "Development of a compound interlaced grating for high energy laser system", *Proceedings of the Society of Photo-Optical Instrumentation Engineers* vol. 240, Jul.-Aug., 1980, pp. 283-292.

(List continued on next page.)

*Primary Examiner*—Bruce Y. Arnold
*Assistant Examiner*—R. D. Shafer
*Attorney, Agent, or Firm*—Townsend & Townsend

[57] ABSTRACT

A transmission grating is used to reduce chromatic aberration in a Fresnel lens, wherein the lens chromatic dispersion is offset and substantially canceled by the grating's diffraction-induced dispersion. The grating comprises a Fresnel-type pattern of microscopic facets molded directly into the lens surface. The facets would typically have a profile height of around $4 \cdot 10^{-5}$ inch and a profile width of at least $10^{-3}$ inch. In its primary intended application, the invention would function to improve the optical performance of a Fresnel lens used to concentrate direct sunlight.

2 Claims, 5 Drawing Sheets

OTHER PUBLICATIONS

H. Madjidi-Zolbanine et al., "Holographic correction of both chromatic and spherical aberrations of single glass lenses", *Applied Optics*, vol 18, No. 14, Jul. 15, 1979, pp. 2385-2393.

Thomas Stone, Nicholas George; "Hybrid Diffractive-Refractive Lenses and Achromats"; Applied Optics; vol. 27, No. 14 pp. 2960-2971; Jul. 15, 1988.

T. Stone, N. George; "Hybrid Singlet Arbitrarily Dispersive Element"; J. Opt. Soc. Am. A 4(3), P77 (1987).

G. M. Morris; "Diffraction Theory for an Achromatic Fourier Transform"; Appl. Opt. 20, 2017 (1981).

N. George, T. Stone; "Achromatized Holographic Phase Shifter and Modulator"; Appl. Opt. 67, 185 (1988).

R. H. Katyl; "Compensating Optical Systems. Parts 1-3"; Appl. Opt. 11, 1241 (1972).

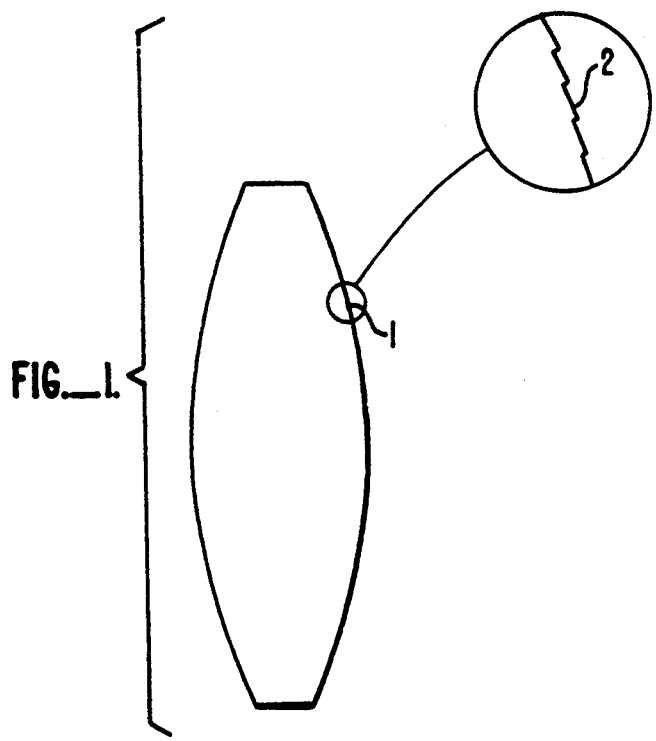
FIG._1.
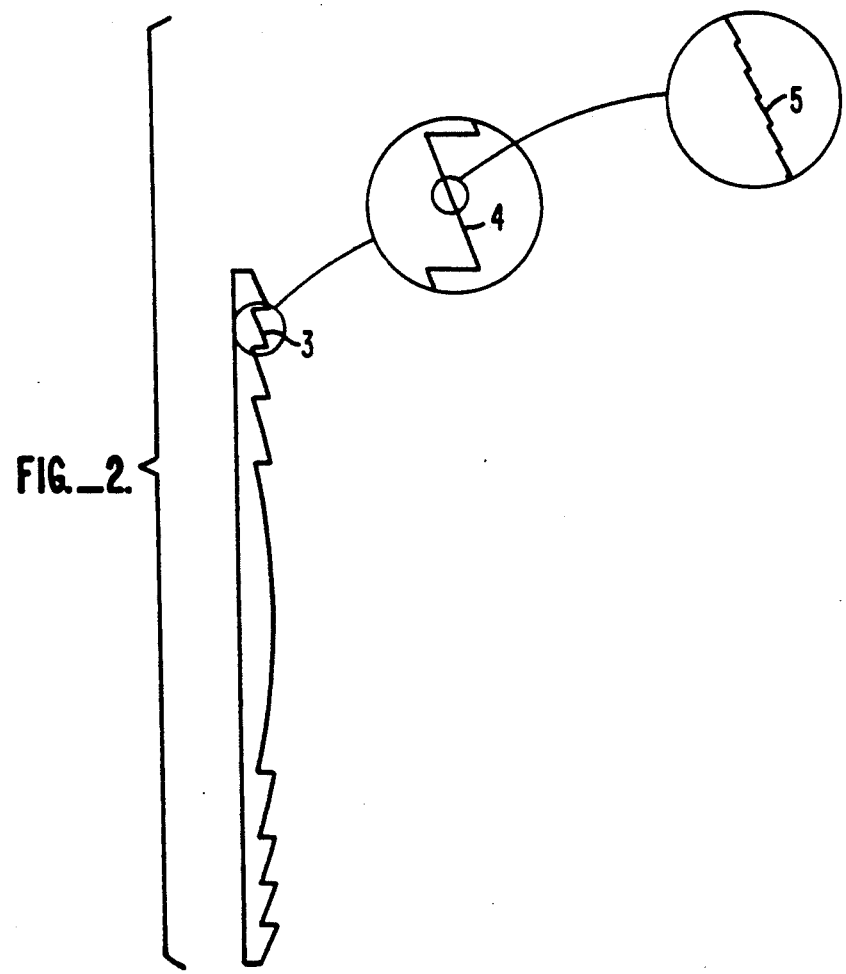
FIG._2.

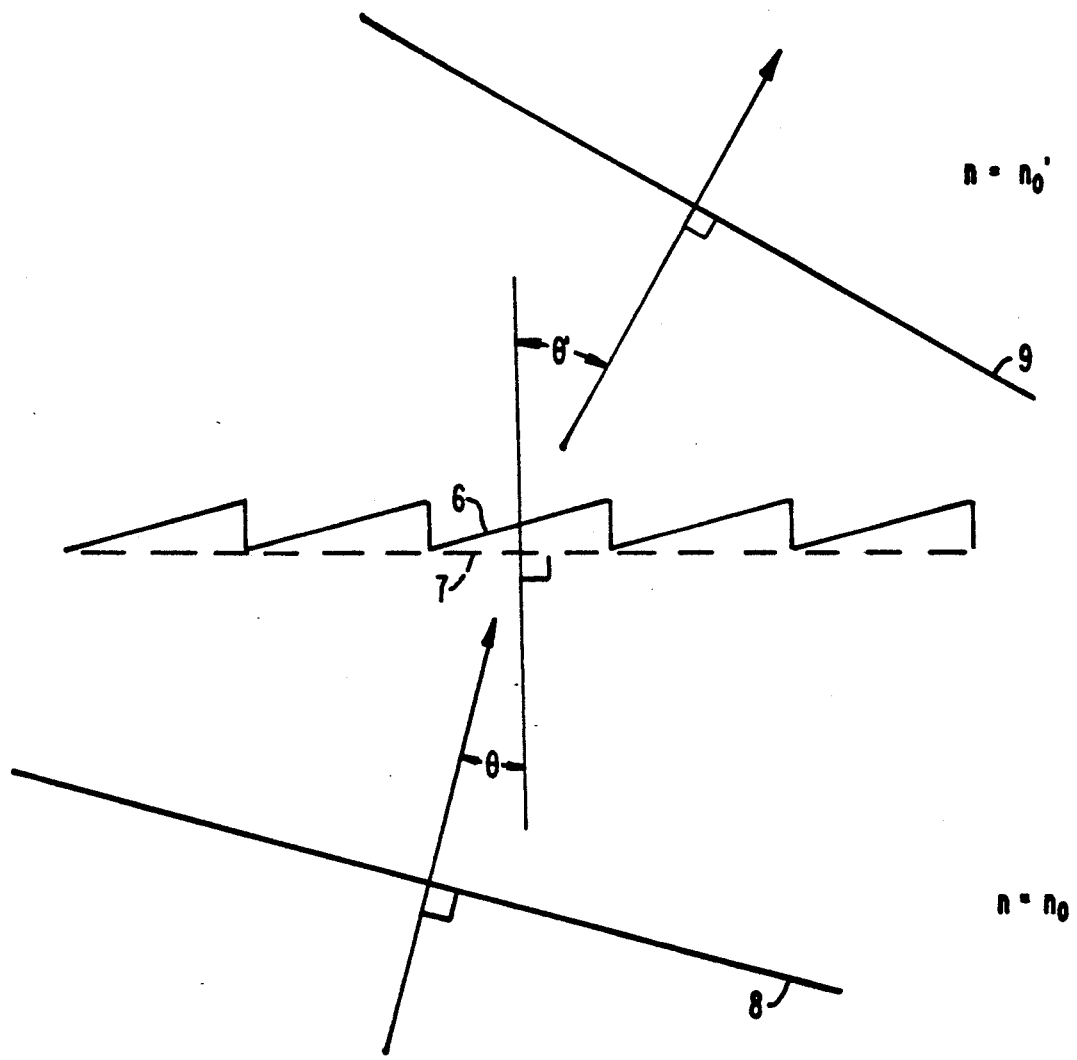
FIG._3.

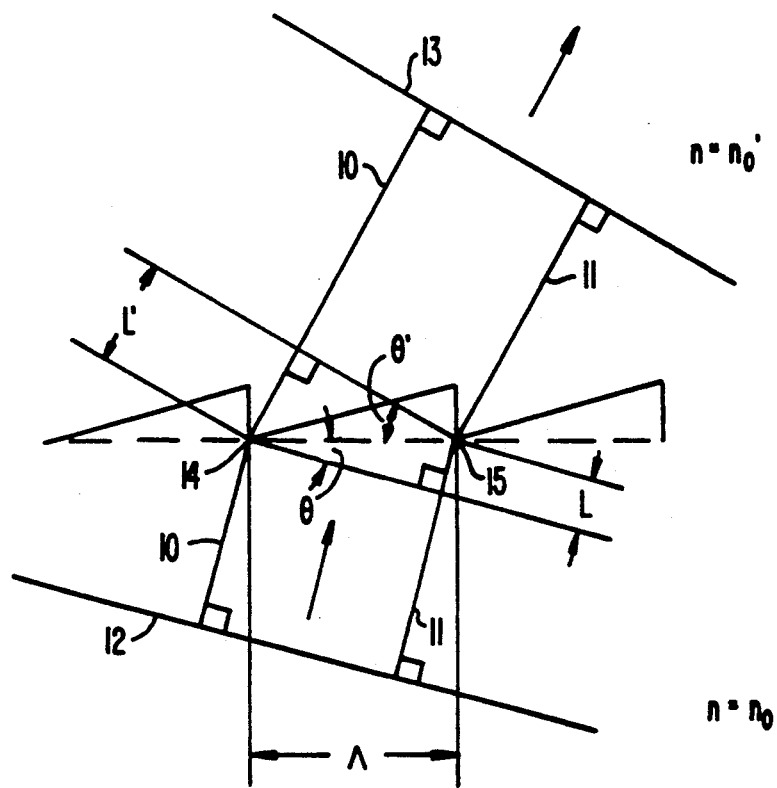
FIG._4.
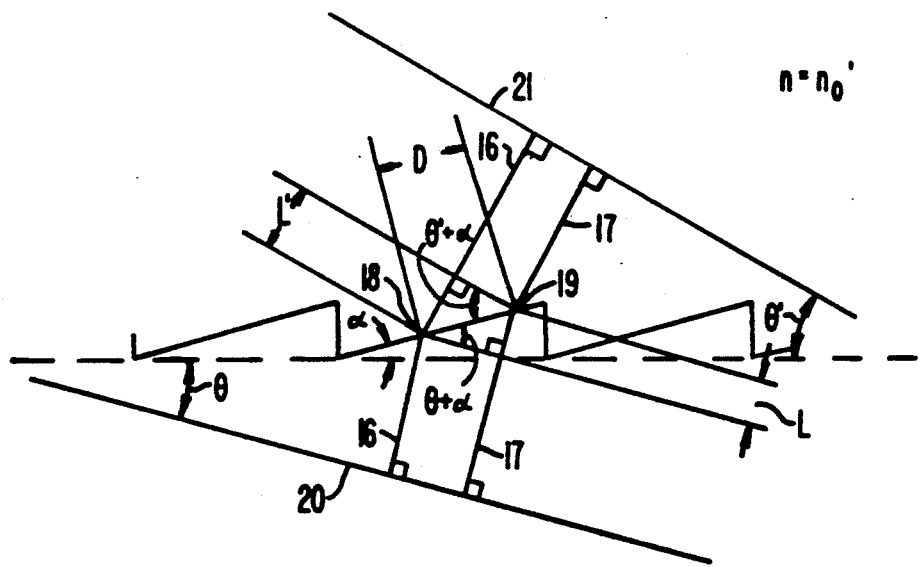
FIG._5.

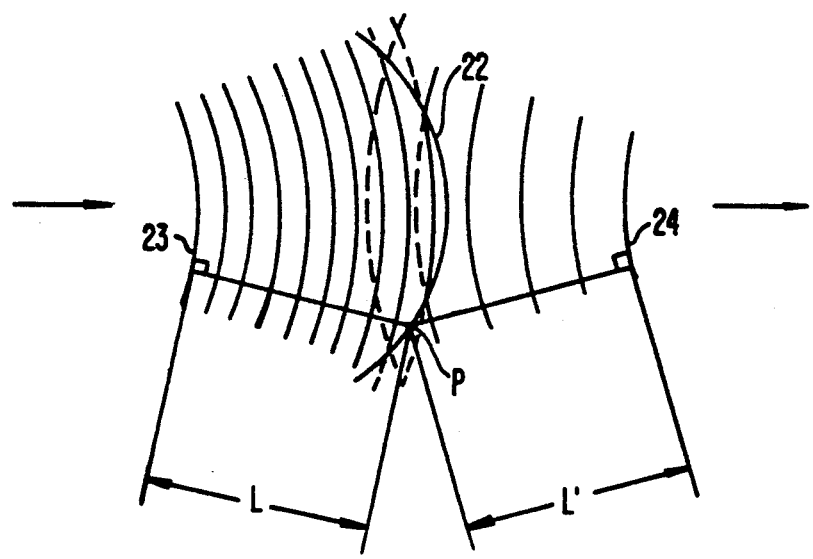
FIG._7.
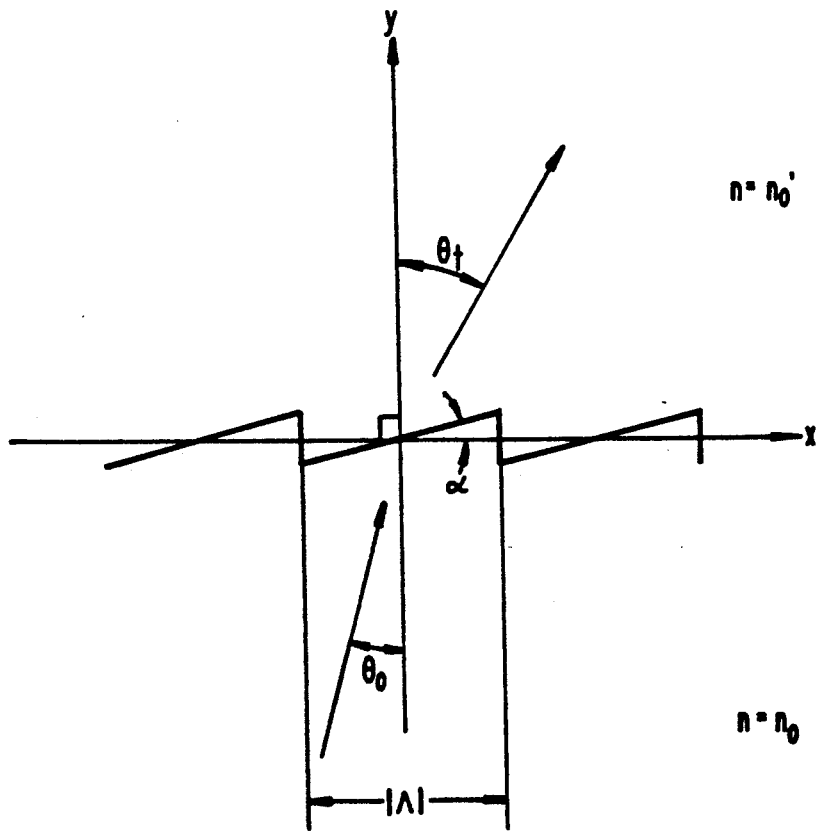
FIG._6.

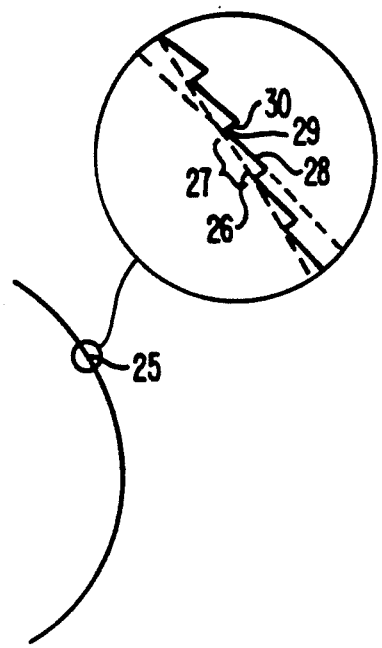
FIG._8.
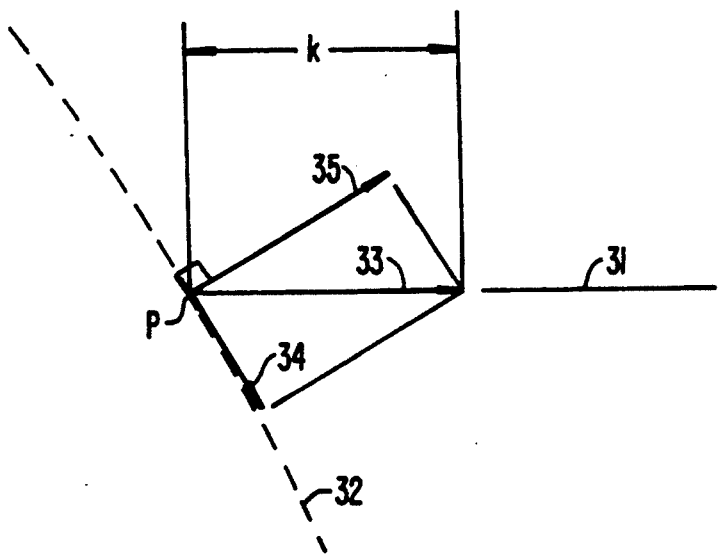
FIG._9.
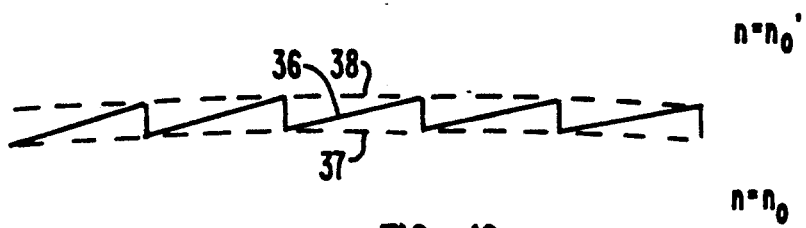
FIG._10.

DISPERSION-COMPENSATED FRESNEL LENS

ACKNOWLEDGMENT

This invention was made with Government support under contract DE-AC03-76SF00098 awarded by the Department of Energy. The Government has certain rights in this invention.

CROSS-REFERENCE TO RELATED APPLICATION

This is a continuation-in-part-application of Ser. No. 243,419, filed Sep. 12, 1988, now abandoned.

REFERENCES

Foster, L. V., "Method and Means for Achromatizing Prisms", U.S. Pat. No. 2,818,765, Jan. 7, 1958.

Lohmann, A. W., "Optical Detour Phase System", U.S. Pat. No. 3,493,287, Feb. 3, 1970.

BACKGROUND OF THE INVENTION

1. Field of the Invention

This invention pertains to the use of a diffraction grating for correcting chromatic dispersion in a Fresnel lens. The primary intended application for the invention would be to improve the optical performance of a Fresnel lens employed as a concentrator element in a high-concentration solar collector.

2. Description of the Prior Art

Chromatic dispersion in an optical system is generally minimized by means of an achromatic doublet comprising two cemented or closely-spaced lens elements composed of optical materials with different dispersive powers. By appropriately balancing the doublet's optical power between the two elements, the combination can be made precisely achromatic at two specific design wavelengths. Color correction at more than two wavelengths can be achieved by using three or more glass materials in the optical system. Such systems exhibit excellent achromatic imaging performance, but this method of dispersion compensation is not practical for many applications due to the high material cost and weight associated with the lens elements and complications associated with multiple-element lens systems. In particular, the method is unsuitable for Fresnel lens systems such as concentrating solar collectors.

A Fresnel lens can be achromatized by means of a dispersion-compensating diffraction grating whose diffraction-induced chromatic dispersion offsets and substantially cancels the lens's refraction-induced dispersion. Two rudimentary systems of this type are known in the prior art: Foster (1958) describes a mechanism comprising two diffraction gratings that function conjunctively to minimize a prism's refraction-induced dispersion. Lohmann (1970) describes the use of a dispersion-compensating grating to offset. diffraction-induced dispersion produced by a phase-modulating grating in a phase contrast microscope. Dispersion-compensating mechanisms such as these are only applicable to optical configurations in which the dispersion-producing and dispersion-compensating elements both function merely to deflect a collimated incident beam into a transmitted beam that is also collimated. More general types of dispersion, such as that produced by refraction at a lens surface, cannot be corrected by these means. Furthermore, these systems have the additional disadvantage that the dispersion-compensating mechanism requires extra optical elements which add to the system cost and complexity and reduce its optical transmittance (due to multiple surface reflection losses).

SUMMARY OF THE INVENTION

The objective of my invention is to offset chromatic aberration in a Fresnel lens by means that do not require any additional optical components.

The dispersion-compensating element comprises a blazed transmission grating formed as a relief pattern superimposed on the lens's Fresnel facets. In addition to minimizing chromatic dispersion, the grating also contributes a marginal amount of optical power to the refractive element. The grating's design configuration is determined so that the element simultaneously generates an output beam of a specified wavefront shape and compensates for chromatic dispersion at both lens surfaces. The grating's dual role as a beam-shaping and dispersion-compensating element obviates the need for any additional dispersion-compensating components, since, even without dispersion compensation, a refractive surface would need to be used in place of the grating to provide the beam-shaping capability.

FIG. 1 illustrates a typical dispersion-compensated lens element's profile geometry (i.e., its cross-sectional geometry in a plane transverse to the grating lines). The grating element comprises a surface relief pattern molded directly into the lens surface 1. Its geometric form is similar to that of a curved Fresnel lens, but with microscopic facet dimensions. (The magnified portion of FIG. 1 illustrates the individual facet elements 2.) The grating lines on an axially symmetric lens would comprise concentric circles with the line density varying radially in approximately direct proportion to distance from the lens axis. Near the edge of a dispersion-compensated lens with a focal ratio of one, the line density would typically be around 1000 lines per inch, which is over an order of magnitude lower than line densities required for most conventional grating applications. (The line density is so low because only a small amount of diffractive dispersion is required to balance the lens's intrinsic refractive dispersion.) The linear-ramp, Fresnel-type facet structure maximizes diffraction efficiency in the primary diffracted order, which would be a 1st or $-$1st order. (A grating with this type of facet geometry is termed a "blazed" grating.) The facet profile height would typically be around $4 \cdot 10^{-5}$ inch over the full lens aperture. (For a line density of 1000 lines per inch, the facet height-to-width ratio would be around 1/25.)

The primary application for which dispersion-compensting gratings are currently being considered would be to improve the optical performance of Fresnel lenses used as solar energy concentrators. FIG. 2 illustrates the profile geometry of a dispersion-compensated Fresnel lens. The lens surface 3 has a two-tiered facet structure comprising large-scale (e.g., 25 line-per-inch) Fresnel facets 4 on which small-scale (e.g., 1000 line-per-inch) grating facets 5 would be superimposed. The Fresnel facets would provide most of the len's optical power, and the grating structure would provide some additional optical power, in addition to compensating for chromatic dispersion.

Chromatic dispersion between two selected design wavelengths can be eliminated by means of a grating structure formed on a single lens surface. The residual dispersion over the visible spectrum would typically be lower than that of an uncorrected lens by around a factor of 10. For solar energy applications, this level of dispersion correction would make it possible to achieve a geometric concentration of up to around 10,000X in a Fresnel lens's focal plane. Diffraction efficiency would be quite high if the system uses only a limited portion of the solar spectrum. Under their currently-envisaged application as solar concentrators in piped illumination systems, dispersion-compensated Fresnel lenses would exhibit spectrally-averaged diffraction efficiency losses of only about 2% in the primary order, based on a typical air-mass-one solar illuminance spectrum. For concentrator photovoltaic applications the efficiency loss would be greater, perhaps as high as 10%, depending on the characteristics of the photovoltaic cell; and for solar thermal applications that utilize the full solar spectrum the efficiency loss would be around 30%, based on a typical air-mass-one solar irradiance spectrum. (The diffraction efficiency loss represents energy that is diffracted into extraneous diffracted orders. This energy would form a halo surrounding the sun image in the lens's focal plane and would be available for capture, but at a comparatively low concentration level.)

Since a dispersion-compensating grating would have an extremely low line density and a very low-profile facet geometry in relation to conventional diffraction gratings, the structure could be produced by standard lens molding processes. For a Fresnel lens, no modification of the fabrication process would be required—the grating structure would simply be incorporated in the molding tool design. The molding tool would typically be formed by a precision turning operation, using a straight-edge, single-crystal diamond cutter to define the grating facet surfaces.

A couple of features distinguish the invention from Foster. The grating element in my invention is formed as an integral part of a refractive optical element that functions as both a beam-shaping and dispersion-compensating element, whereas in Foster's invention the grating forms a separate and distinct optical element which has no refractive optical power. Moreover, Foster specifically requires two diffraction gratings, and does not anticipate a dispersion-compensating mechanism comprising a single grating element.

The dispersion-compensating means discussed in this specification can be extended in an obvious manner to reflection gratings as well as transmission gratings, but only the latter type are disclosed herein.

BRIEF DESCRIPTION OF THE DRAWINGS

FIG. 1 illustrates a typical dispersion-compensated lens's profile geometry (i.e., its sectional geometry in a plane transverse to the grating lines).

FIG. 2 illustrates the profile geometry of a dispersion-compensated Fresnel lens.

FIG. 3 is a sectional view of a uniform grating structure under illumination by a plane wavefront.

FIG. 4 illustrates a derivation of the grating equation based on the phase-matching principle.

FIG. 5 illustrates a derivation of the blaze condition based on the phase-matching principle.

FIG. 6 defines the coordinate system used in deriving the grating efficiency formula.

FIG. 7 illustrates an application of the phase-matching principle to the simple problem of designing a conventional refracting lens surface.

FIG. 8 illustrates the structural elements of a dispersion-compensating diffraction grating.

FIG. 9 illustrates a procedure by which a diffracted beam's phase distribution can be determined from a specification of its phase over the grating substrate.

FIG. 10 illustrates a structural distinction between a dispersion-compensating element and the refractive optical element on which it is formed.

DETAILED DESCRIPTION OF THE INVENTION

UNIFORM GRATING CONFIGURATIONS

Prior to developing the theory of dispersion-compensating gratings, we will first review some basic principles relating to diffraction gratings in general. FIG. 3 illustrates the configuration that we will initially be considering. The grating comprises a set of parallel grooves (or "lines"; e.g., groove 6, shown cross-sectionally in FIG. 3) on a surface separating two optical media whose refractive indexes n are indicated as $n_o$ and $n_o'$. We refer to an imaginary surface 7 tangent to the grooves as the "grating substrate". We will initally restrict our attention to a "uniform" grating structure, which is characterized by the following properties: The substrate is flat; the groove structure has translational symmetry in a direction parallel to the grating lines; and the structure has periodic symmetry in the direction perpendicular to the grating lines and parallel to the substrate. In addition, we shall also assume that the incident beam is collimated (i.e., its wavefronts are planar).

Although a dispersion-compensating grating would typically be nonuniform, a uniform grating model would generally fairly accurately represent the diffraction geometry over any small-scale region on the grating aperture over which the grating structure is substantially uniform (i.e., a region that is large in comparision to the grating period, but small in comparision to the grating aperture dimension and the curvature radii of the substrate, the grating lines, and the incident wavefront).

We will initially only consider diffraction geometries in which the incident beam's propagation direction is perpendicular to the grating lines. (The analysis will later be extended to include the more general "conical diffraction" case.) FIG. 3 illustrates an incident plane wavefront 8 impinging on the grating in the index-$n_o$ medium at an incident angle of $\theta$ relative to the grating substrate. The grating will scatter the beam into a number of collimated diffracted beams, one of which is illustrated in FIG. 3 as a plane wave 9 transmitting into the index-$n_o'$ medium with an exit angle $\theta'$ relative to the substrate.

The diffracted orders' exit angles $\theta'$ (FIG. 3) can be determined by a phase-matching condition: Considering two reference wavefronts, one in the incident beam and one in a diffracted beam, the optical path length between these two wavefronts along any two rays traversing corresponding points on adjacent grooves (e.g., adjacent troughs) must differ by some integer number of wavelengths. This is illustrated in FIG. 4: Ray segments 10 and 11 traverse the grating from wavefront 12 to wavefront 13, crossing adjacent trough points 14 and 15. The portion of segment 11 in the index-$n_o$ medium is longer than that of segment 10 by a difference $L = \Lambda \sin \theta$ (where $\Lambda$ is the grating period) and the portion of segment 10 in the index-$n_o'$ medium is longer than that of segment 11 by a difference $L' = \Lambda \sin \theta'$. Thus, the phase-matching principle implies that $$\frac{\Lambda \sin \theta'}{\lambda_o'} = \frac{\Lambda \sin \theta}{\lambda_o} + m; \qquad (1)$$

for some integer m, where $\lambda_o$ and $\lambda_o'$ are the wavelengths in the index-$n_o$ and index-$n_o'$ media, respectively. $\lambda_o$ and $\lambda_o'$ are each smaller than the the free-space wavelength $\lambda$ by a factor of the refractive index:

$$\lambda_o = \lambda/n_o, \qquad (2)$$

$$\lambda_o' = \lambda/n_o'.$$

Equation (1) is the "grating equation" for the m-th diffracted order. In general, a separate diffracted order will be generated in the index-$n_o'$ medium for each integer m. (Corresponding reflected orders will also be scattered back into the index-$n_o$ medium, but these are not of interest for the present application.) We will only be concerned with first-order diffraction since a dispersion-compensated optical system would generally utilize only the first order, so we will set m equal to 1 in equation (1):

$$m = 1. \qquad (3)$$

With the above substitutions, the grating equation (1) for the first order reduces to $$n_o' \sin \theta' = n_o \sin \theta + \lambda/\Lambda \qquad (4)$$

In some instances a dispersion-compensating grating's primary diffracted order will actually be a $-1$st order, but in this situation we can alternatively represent the primary order as a $+1$st order by defining $\Lambda$ as a negative quantity. Referring to equation (1), a grating operating in the $-1$st order ($m = -1$) with $\Lambda > 0$ is formally equivalent to one operating in the $+1$st order ($m = +1$) with $\Lambda < 0$; hence we can set m to $+1$ in either case and can use the sign of $\Lambda$ to indicate whether the grating is actually operating in the $+1$st or $-1$st order.

According to the phase-matching condition described above, the radiance emitted from corresponding points of the grating profile on different grooves will converge in phase at an image point where the m-th order is brought to a focus. The radiance originating from different parts of the groove profile may combine out of phase, however, resulting in low diffraction efficiency in the m-th order. In order to achieve high efficiency in a particular diffracted order, the grating profile shape would also be defined by a phase-matching condition: Again considering two reference wavefronts, one in the incident beam and one in a diffracted beam, the optical path length between these two wavefronts along any two rays traversing the groove profile should be identical. As illustrated in FIG. 5, this condition will hold if the grating facets have a linear-ramp profile shape with an appropriately chosen facet angle $\alpha$. Considering two ray segments 16 and 17 that cross facet points 18 and 19 while traversing from wavefront 20 to wavefront 21, the portion of segment 17 in the index-$n_o$ medium is longer than that of segment 16 by a difference $L = D \sin(\theta + \alpha)$, where D is the distance between points 18 and 19, and the portion of segment 16 in the index-$n_o'$ medium is longer than that of segment 17 by a difference $L' = D \sin(\theta' + \alpha)$. Diffraction efficiency will be maximized when the phase-matching condition $L/\lambda_o = L'/\lambda_o'$ holds, or equivalently, $$n_o' \sin(\theta' + \alpha) = n_o \sin(\theta + \alpha). \qquad (5)$$

(Note that this relation is simply Snell's Law, applied at the facet surface.)

A grating with a linear-ramp facet profile geometry of the type illustrated in FIG. 5 is termed a "blazed transmission grating"; equation (5) is termed the "blaze condition"; and the particular wavelength $\lambda$ that satisfies equation (5) (with $\theta'$ implicitly defined by the 1st-order grating equation (4)) is termed the "blaze wavelength". The facet angle $\alpha$ that satisfies the blaze condition for a particular diffraction geometry and blaze wavelength can be obtained from equation (5), which can be equivalently stated $$\tan \alpha = \frac{\lambda}{\Lambda(n_o \cos\theta - n_o' \cos\theta')}. \qquad (6)$$

Dispersion Compensation

Given a specification of an incident beam's angle of incidence $\theta$, its wavelength $\lambda$, and the exit angle $\theta'$ defining the direction into which the beam is to be diffracted, a grating structure that will diffract the beam efficiently into a first diffracted order propagating in the specified direction can be determined a two-step process: We first determine the grating period $\Lambda$ so that the diffracted beam has the specified propagation angle $\theta'$; and we then determine the grating's facet angle $\alpha$ so that the diffraction efficiency in the first order is maximized. ($\Lambda$ is determined by the grating equation (4) and $\alpha$ is defined by the blaze condition (6).)

The above design procedure presumes that the grating substrate's orientation relative to the incident beam is specified. If the substrate orientation is not predetermined, however, we have an extra degree of freedom which can be taken advantage of so that two specified wavelengths can be made to simultaneously diffract in the designated direction (taking into consideration the dependence of $n_o$ and $n_o'$ on wavelength). We will first consider how this can be accomplished for two very close wavelengths $\lambda_g$ and $\lambda_g + \delta\lambda$, where $\delta\lambda$ is a small quantity. (If we interpret $\delta\lambda$ as an infintesimal, the exit angle's derivative with respect to wavelength, $d\theta'/d\lambda$, will be zero at the design wavelength $\lambda_g$.) In order to obtain good dispersion-compensating performance over the visible spectrum the design wavelength $\lambda_g$ would typically be chosen in the green part of the spectrum (hence the subscript "g").

Before developing the grating design, we will make a couple of generalizations: We suppose that the two design wavelengths originate from the same source, but that prior to intercepting the grating they may have transmitted through preceding dispersive elements that may have caused their incident angles $\theta$ at the grating substrate to diverge slightly. (If the grating is formed on a lens element's back surface, for example, refraction at the front surface would induce chromatic dispersion in the beam before it intercepts the grating.) The incident angles associated with wavelengths $\lambda_g$ and $\lambda_g + \delta\lambda$ will be indicated as $\theta$ and $\theta + \delta\theta$, respectively. We will also suppose that the two design wavelengths are to be brought to a common focus, but that after traversing the grating they may need to diverge slightly in order to offset the effect of chromatic dispersion at optical interfaces following the grating. (If the grating is located on a lens element's front surface, for example, the grating would need to induce some chromatic dispersion in the beam in order to offset refraction-induced dispersion at the back surface.) The exit angles for wavelengths $\lambda_g$ and $\lambda_g + \delta\lambda$ will be indicated as $\theta'$ and $\theta' + \delta\theta'$, respectively.

The incident and exit dispersion angles $\delta\theta$ and $\delta\theta'$ are specified, but since the grating's substrate orientation is not predetermined $\theta$ and $\theta'$ are not initially specified. Instead, we specify the deflection angle $\Psi$ between the incident and exit beams at wavelength $\lambda_g$. $\Psi$ is the difference between $\theta$ and $\theta'$:

$$\Psi = \theta' - \theta. \tag{7}$$

From the grating equation (4) the diffraction geometry for wavelength $\lambda_g$ is constrained by the relation $$n_o' \sin \theta' = n_o \sin \theta + \lambda_g / \Lambda \tag{8}$$

where $n_o$ and $n_o'$ are the refractive indexes at $\lambda = \lambda_g$ on the grating's incident and exit sides, respectively. Indicating the corresponding index values at $\lambda = \lambda_g + \delta\lambda$ as $n_o + \delta n_o$ and $n_o' + \delta n_o'$, we similarly obtain $$(n_o' + \delta n_o') \sin (\theta' + \delta\theta') = (n_o + \delta n_o) \sin (\theta + \delta\theta) + (\lambda_g + \delta\lambda)/\Lambda. \tag{9}$$

Subtracting (8) from (9) and using first-order differential approximations, we obtain $$(\delta n_o' \sin \theta' + n_o' \delta\theta' \cos \theta') = (\delta n_o \sin \theta + n_o \delta\theta \cos \theta) + \delta\lambda/\Lambda. \tag{10}$$

Using equations (7), (8), and (10) we can solve for the three unknowns $\theta$, $\theta'$, and $\Lambda$. Using (7) to eliminate $\theta'$ in (8) and (10) and then eliminating $\Lambda$ between (8) and (10) and solving for $\theta$, we obtain $$\tan\theta = \frac{(n_o' \sin\Psi) - \lambda_g(\delta n_o' \sin\Psi + n_o' \delta\theta' \cos\Psi - n_o \delta\theta)/\delta\lambda}{(n_o - n_o' \cos\Psi) + \lambda_g(\delta n_o' \cos\Psi - n_o' \delta\theta' \sin\Psi - \delta n_o)/\delta\lambda} \tag{11}$$

(The ratios of infintesimal quantities in (11) may be interpreted as derivatives; e.g., $\delta n_o/\delta\lambda = dn_o/d\lambda|_{\lambda=\lambda_g}$.) Equation (11) determines the grating substrate's orientation relative to the incident beam; and given $\theta$ we then obtain $\theta'$ and $\Lambda$ from (7) and (8). (This procedure may yield a negative value for $\Lambda$, indicating that the grating is actually operating in the $-1$st order.) In order to maximize diffraction efficiency for wavelengths near $\lambda_g$, we may define the grating facet angle $\alpha$ by equation (6), with all parameters evaluated at the design wavelength $\lambda_g$.

The above design procedure results in excellent dispersion correction for narrow-band applications; but when designing for a wide spectral band better performance can be obtained by using two widely separated design wavelengths $\lambda_r$ and $\lambda_b$ (which would typically be in the red and blue parts of the spectrum, respectively). We will indicate the incident angles for wavelengths $\lambda_r$ and $\lambda_b$ as $\theta_r$ and $\theta_b$, respectively; and the corresponding exit angles will similarly be indicated as $\theta_r'$ and $\theta_b'$. We specify the following design parameters: the dispersion angle $\Delta\theta$ between the red and blue incident rays, $$\Delta\theta = \theta_r - \theta_b, \tag{12}$$

and the red and blue rays' respective deflection angles $\Psi_r$ and $\Psi_b$:

$$\Psi_r = \theta_r' - \theta_r, \tag{13}$$

$$\Psi_b = \theta_b' - \theta_b. \tag{14}$$

Applying the grating equation (4), we obtain $$n_r' \sin \theta_r' = n_r \sin \theta_r + \lambda_r/L, \tag{15}$$

$$n_b' \sin \theta_b' = n_b \sin \theta_b + \lambda_b/L; \tag{16}$$

where $n_r$ and $n_r'$ are the refractive index values (previously indicated as $n_o$ and $n_o'$) at wavelength $\lambda_r$ on the grating's incident and exit sides, respectively, and $n_b$ and $n_b'$ are the corresponding index values for wavelength $\lambda_b$. The grating configuration is determined by solving the five equations (12)–(16) for the five unknowns $\theta_r$, $\theta_b$, $\theta_r'$, $\theta_b'$, and $\Lambda$. Using (12)–(14) to eliminate $\theta_r$, $\theta_r'$, and $\theta_b'$ in (15) and (16) and then eliminating $\Lambda$ between (15) and (16) and solving for $\theta_b$, we obtain $$\tan\theta_b = \tag{17}$$

$$\frac{\lambda_r(n_b' \sin(\Psi_b)) - \lambda_b(n_r' \sin(\Delta\theta + \Psi_r) - n_r \sin(\Delta\theta))}{\lambda_r(n_b - n_b' \cos(\Psi_b)) + \lambda_b(n_r' \cos(\Delta\theta + \Psi_r) - n_r \cos(\Delta\theta))}.$$

Given $\theta_b$, we can obtain $\theta_b'$ from (14) and can then determine $\Lambda$ from (16); and $\theta_r$ and $\theta_r'$ are determined from (12) and (13).

When designing a grating for wide-band applications, the facet profile shape would be designed to maximize some measure of the grating's spectrally-averaged diffraction efficiency (using an appropriate spectral weighting function, such as the solar illuminance spectrum for daylighting applications). The straight-profile blazed grating profile shape described above would only be strictly optimum when the grating is designed to maximize efficiency at a single design wavelength; but for wide-band applications the optimum degree of profile curvature and the performance advantage gained by using a curved facet profile would be insignificant, so the grating could in practice have a simple straight profile structure with its blaze wavelength chosen to maximize the band-averaged efficiency. (A blazed grating's diffraction efficiency as a function of incident angle and wavelength can be predicted using a general efficiency formula, equation (35), which will be developed below.) Once the grating's substrate orientation and period are determined (from equations (17), (14) and (16)), the facet angle $\alpha$ may be defined by choosing an appropriate blaze wavelength near the middle of the spectral band, determining this wavelength's exit angle $\theta'$ from the grating equation (4), and then using the blaze condition (6) to calculate $\alpha$.

Diffraction Efficiency

In order to optimize a dispersion-compensating grating's design and fully characterize its performance, we must be able to quantify its diffraction efficiency as a function of wavelength and incident angle. We will develop a general formula here for a uniform grating's diffraction efficiency, which we define as the fraction of transmitted radiant energy that is in the the first order. (Surface reflection losses are not included in this efficiency factor, but the reflection loss would be essentially equivalent to that of a conventional refractive lens surface and may be determined from the Fresnel reflection formulas. Standard means such as antireflection coatings may be used to mitigate reflection losses at the grating surface.)

FIG. 6 illustrates the system of coordinates that will be used in the following analysis. The grating profile is defined by the relation $y=f(x)$, where $$f(x) = x \tan \alpha \text{ for } |x| < |\Lambda/2|; \tag{18}$$

$$f(x+\Lambda) = f(x). \tag{19}$$

(As discussed previously, the grating period $\Lambda$ may be formally defined as a negative quantity.) The refractive index n has the form $$n = \begin{matrix} n_o \text{ for } y < f(x) \\ n_o' \text{ for } y > f(x). \end{matrix} \tag{20}$$

For the present analysis, we assume that the incident beam is collimated with its propagation direction parallel to the x-y plane (i.e., perpendicular to the grating lines), and we assume that the beam's polarization vector is perpendicular to the x-y plane (transverse electric polarization case). We will represent the electric field in terms of its complex scalar amplitude distribution E, with the time dependence $\exp(-i(2\pi/\lambda)ct)$ being implicit. (t is the time coordinate, c is the free-space speed of light, and $\lambda$ is the free-space wavelength). The electric field in the space $y<f(x)$ has the form $$E = A_i \exp(i\Phi_i) \, (+ \text{ backscattered component}) \text{ for } y<f(x) \tag{21}$$

where $A_i$ is the incident field amplitude ($A_i$ is constant) and $\Phi_i$ is the incident field's phase distribution, which has the form $$\Phi_i|_{x,y} = 2\pi \frac{n_o}{\lambda} (x\sin\theta_O + y\cos\theta_O), \tag{22}$$

where $\theta_O$ is the beam's incident angle at the grating substrate (FIG. 6). (The "backscattered component" in equation (21) represents reflected diffracted orders, which are not of interest for the present analysis.)

Generally, a dispersion-compensating grating's period $\Lambda$ would be at least one or two orders of magnitude greater than the wavelength $\lambda$, so the electric field in the immediate vicinity of a grating facet can be represented fairly accurately by the form that it would take in the limit that $\Lambda$ approaches infinity. In this limit the transmitted field has the form of a collimated beam whose propagation angle $\theta_t$ (FIG. 6) is determined by applying Snell's Law at the grating surface:

$$n_o' \sin(\theta_t+\alpha) = n_o \sin(\theta_0+\alpha). \tag{23}$$

This representation of the transmitted field would not be valid in the immediate vicinity of the facet boundaries where the field's plane-wave form would be perturbed by edge scattering effects analogous to the shadowing and blocking effects that occur in the vicinity of a conventional Fresnel len's facet sidewalls. But these effects would generally be negligible due to the grating's extremely low-profile facet structure. (For a dispersion-compensating grating, the facet angle $\alpha$ would typically be in the range of a couple degrees or less.) The transmitted field's plane-wave representation based on Snell's Law (23) would also not be valid in regions far from the grating surface where the aperture diffraction patterns from many grating facets would overlap, but we will only assume that the representation holds out to the level of the facet peaks at $y=|\Lambda/2|\tan\alpha$. We will represent the transmitted electric field in the immediate vicinity of a patricular grating facet approximately as $$E \approx A_t \exp(i\Phi_t) \text{ for } |x| < |\Lambda/2| \text{ and} \\ f(x) < y < |\Lambda/2| \tan \alpha \tag{24}$$

where $A_t$ the the transmitted field's amplitude and $\Phi_t$ is its phase distribution, $$\Phi_t|_{x,y} = 2\pi \frac{n_o'}{\lambda} (x\sin\theta_t + y\cos\theta_t). \tag{25}$$

(The reflected field in the immediate vicinity of a grating facet can similarly be represented approximately as a collimated beam whose propagation direction is determined by applying the law of reflection at the grating surface. The transmitted field amplitude $A_t$ and reflected amplitude can be determined by applying continuity conditions on the electric field and its normal derivative at the grating surface. For purposes of this analysis, however, we are not interested in analyzing reflection effects but are rather concerned with determined how the transmitted energy is allocated between diffracted orders, so we will leave $A_t$ undetermined.)

As a consequence of the grating's periodic symmetry, the transmitted electric field outside of the grating region can be represented by a Rayleigh expansion of the form $$E = \sum_m A_m' \exp(i\Phi_m') \text{ for } y > |\Lambda/2|\tan\alpha. \tag{26}$$

$A_m'$ is the m-th transmitted order's amplitude and $\Phi_m'$ is its phase distribution, $$\Phi_m'|_{x,y} = 2\pi \frac{n_o'}{\lambda} (x\sin\theta_m' + y\cos\theta_m'). \tag{27}$$

where $\theta_m'$ is the m-th order propagation angle, which is determined by the grating equation, $$n_o' \sin \theta_m' = n_o \sin \theta_0 + m\lambda/\Lambda. \tag{28}$$

The total transmitted flux impinging on the plane $y=|\Lambda/2|\tan\alpha$ is proportional to $|A_t|^2 \partial\Phi_t/\partial y$, which is equal to $|A_t|^2 (2\pi n_o'/\lambda) \cos\theta_t$; and the flux leaving this plane in the m-th order is proportional to $|A_m'|^2 \partial\Phi_m'/\partial y$, or equivalently $|A_m'|^2 (2\pi n_o'/\lambda) \cos\theta_m'$. Hence the m-th order diffraction efficiency $\eta_m$ (ratio of flux in the m-th order to the total transmitted flux) is $$\eta_m = \frac{\cos\theta_m'}{\cos\theta_t} \left| \frac{A_m'}{A_t} \right|^2. \tag{29}$$

The Rayleigh coefficients $A_m'$ can be estimated by equating expressions (24) and (26) at $y=|\Lambda/2|\tan\alpha$:

$$A_i \exp(i\Phi_i) \simeq \sum_m A_m' \exp(i\Phi_m') \text{ at } y = |\Lambda/2| \tan\alpha. \quad (30)$$

Multiplying both sides of this expression by $\exp(-i\Phi_1')$ and integrating from $x = -\Lambda/2$ to $x = \Lambda/2$, we obtain an expression for $A_1'$ that can be substituted into (29) to obtain $$\eta_m \simeq \frac{\cos\theta_m'}{\cos\theta_t} \operatorname{sinc}^2\left(\pi \frac{n_o'}{\lambda} \Lambda(\sin\theta_t - \sin\theta_m')\right). \quad (31)$$

The Rayleigh coefficients can alternatively be estimated by applying the continuity condition on $\partial E/\partial y$ at $y = |\Lambda/2| \tan\alpha$:

$$\frac{\partial}{\partial y}(A_i \exp(i\Phi_i)) \simeq \frac{\partial}{\partial y} \sum_m A_m' \exp(i\Phi_m') \text{ at } y = |\Lambda/2|\tan\alpha. \quad (32)$$

Starting from this condition we obtain a diffraction efficiency estimate which is similar to (31) except that the cosine factors are interchanged:

$$\eta_m \simeq \frac{\cos\theta_t}{\cos\theta_m'} \operatorname{sinc}^2\left(\pi \frac{n_o'}{\lambda} \Lambda(\sin\theta_t - \sin\theta_m')\right). \quad (33)$$

As a consequence of the simplifying approximation that we have made in representing the transmitted field by equation (24) in the grating region, the efficiency estimates (31) and (33) are not precisely consistent; but when $|\Lambda| \gg \lambda$ the $\operatorname{sinc}^2$ term in these expressions will only be of significant magnitude when $\theta_t$ is approximately equal to $\theta_m'$, in which case the cosine terms will be practically equal. Hence, the difference between the cosine terms can be neglected and we can represent the diffraction efficiency as $$\eta_m = \operatorname{sinc}^2\left(\pi \frac{n_o'}{\lambda} \Lambda(\sin\theta_t - \sin\theta_m')\right). \quad (34)$$

$\eta_m$ is maximized and equal to 1 when the m-th order "blaze condition", $\theta_m' = \theta_t$, is satisfied (i.e., when the m-th order diffraction angle $\theta_m'$ defined by the grating equation (28) coincides with the angle of refraction $\theta_t$ defined by applying Snell's Law (23) at the grating facet surface).

By eliminating the $\sin\theta_m'$ term between (34) and (28) we obtain the following alternative expression for $\eta_m$:

$$\eta_m = \operatorname{sinc}^2\left(\pi\left(\frac{\lambda_B}{\lambda} - m\right)\right), \quad (35)$$

where $\lambda_B$ is the "blaze wavelength" defined by $$\lambda_B = \Lambda(n_o' \sin\theta_t - n_o \sin\theta_0) \quad (36)$$

(The sign of $\Lambda$ would conventionally be defined so that $\lambda_B$ is a positive quantity.) For a fixed diffraction geometry $\lambda_B$ is constant and the efficiency in the first order is maximized when $\lambda = \lambda_B$. It follows from (35) that the efficiency formula (34) satisfies the energy conservation relation, $$\sum_m \eta_m = 1. \quad (37)$$

A dispersion-compensating grating would not necessarily need to operate in the 1st (or $-1$st) diffracted order. According to equation (35), high diffraction efficiency in the m-th order can be obtained at any particular design wavelength $\lambda$ by choosing a blaze wavelength $\lambda_B = m\lambda$. But the diffraction bandwidth would be very low if a high diffracted order is used, so a practical dispersion-compensating grating would need to operate in the 1st (or $-1$st) order.

Conical Diffraction Geometries

The above analysis applies only to planar diffraction geometries in which the incident beam's propagation direction is perpendicular to the grating lines. (The diffraction efficiency derivation also assumes transverse electric polarization.) For the more general case, we will again consider the diffraction geometry illustrated in FIG. 6, but we consider the incident beam's propagation direction to be inclined to the plane of the figure (i.e., the plane normal to the grating lines) by an angle $\phi$. We introduce a third coordinate $z$ with the z-axis running parallel to the grating lines, and we represent the electric field vector $E$ in the incident medium as $$E = A_i \exp(i\Phi_i) \; (+ \text{ backscattered component}) \text{ for } y < f(x) \quad (38)$$

where $A_i$ is the incident field's amplitude vector and $\Phi_i$ is its phase distribution, which has the form $$\Phi_i|_{x,y,z} = 2\pi \frac{n_o}{\lambda}((x\sin\theta_O + y\cos\theta_O)\cos\phi + z\sin\phi), \quad (39)$$

where $\theta_0$ is the incident beam's projected propagation angle (i.e., the angle between the the substrate normal, or y-axis in FIG. 6, and the projection of the beam's propagation direction in the plane of FIG. 6).

The transmitted field in the immediate vicinity of a particular facet has the approximate form of a refracted plane wave, $$E \simeq A_t \exp(i\Phi_t) \text{ for } |x| < |\Lambda/2| \text{ and } f(x) < y < |\Lambda/2|\tan\alpha \quad (40)$$

where $A_t$ is the transmitted field's amplitude vector and $\Phi_t$ is its phase distribution, $$\Phi_t|_{x,y,z} = 2\pi \frac{n_o'}{\lambda}((x\sin\theta_t + y\cos\theta_t)\cos\phi' + z\sin\phi'). \quad (41)$$

The inclination angle $\phi'$ of the transmitted field's propagation direction relative to the plane of FIG. 6 and its projected propagation angle $\theta_t$ in the plane of the figure are determined by the following generalized Snell's Law relations:

$$n_o' \sin\theta' = n_o \sin\theta, \quad (42)$$

$$n_o' \sin(\theta_t + \alpha)\cos\theta' = n_o \sin(\theta_0 + \alpha)\cos\theta. \quad (43)$$

Outside of the grating region the field has the form of a generalized Rayleigh expansion, $$E = \sum_m A_m' \exp(i\Phi_m') \text{ for } y > |\Lambda/2|\tan\alpha. \quad (44)$$

where $A_m'$ is the m-th diffracted order's amplitude vector and $\Phi_m'$ is its phase distribution, $$\Phi_m'|_{x,y,z} = 2\pi \frac{n_o'}{\lambda}((x\sin\theta_m' + y\cos\theta_m')\cos\phi' + z\sin\phi'). \quad (45)$$

The diffracted rays form a conical fan defined by the orders' common inclination angle $\phi'$. The m-th order's projected propagation angle $\theta_m'$ is defined by the generalized grating equation, $$n_o' \sin\theta_m' \cos\Phi' = n_o \sin\theta_0 \cos\Phi + m\lambda/\Lambda. \quad (46)$$

(Conical diffraction geometries would not typically be encountered with dispersion-compensating gratings since the dispersion of the diffracted orders' inclination angle $\phi'$ is determined soley by Snell's Law (42) and hence cannot be influenced or corrected by the grating. But in some optical configurations the refraction-induced dispersion of $\phi'$ at the grating surface might be offset by dispersion in another optical element, so a dispersion-compensating grating could operate in a conical diffraction mode.)

An analysis similar to that outlined above yields the following general formula for the m-th order diffraction efficiency $\eta_m$:

$$\eta_m = \text{sinc}^2\left(\pi \frac{n_o'}{\lambda} \Lambda(\sin\theta_I - \sin\theta_m')\cos\phi'\right); \quad (47)$$

or equivalently, $$\eta_m = \text{sinc}^2\left(\pi\left(\frac{\lambda_B}{\lambda} - m\right)\right), \quad (48)$$

where the blaze wavelength $\lambda_B$ is defined by $$\lambda_B = \Lambda (n_o' \sin\theta_I \cos\phi' - n_o \sin\theta_0 \cos\phi). \quad (49)$$

Nonuniform Grating Design Procedures

The above analysis only considers diffraction of a collimated beam from a uniform grating structure. This model can fairly accurately represent a nonuniform grating's diffraction characteristics over any small, localized region on the grating; but for general design purposes it would be more convenient to use a design procedure that applies directly to nonuniform structures, rather than developing the design by piecing together a continuum of localized uniform grating geometries. We will develop such a generalized design procedure here, using an adaptation of the phase-matching principle.

To introduce the procedure, we will first consider how the phase-matching principle can be applied to the simple problem of designing a conventional refracting lens surface. The incident and refracted beams' design geometries will be defined in terms of their respective phase distribution $\Phi$ and $\Phi'$, which are functions of positional coordinates. The beams' geometric wavefronts are surfaces of constant phase, and the geometric rays are trajectories that are tangent to the phase gradient (i.e., normal to the wavefronts). Referring to FIG. 7, the incident beam's phase distribution $\Phi$ defines, for any point P in the vicinity of the lens surface 22, the optical phase distance $\Phi|_P$ (i.e., $2\pi \times$ number of wavelengths) from a designated reference wavefront 23 in the incident beam to P. The refracted beam's phase distribution $\Phi'$ similarly defines the optical phase distance $\Phi'|_P$ from a designated reference wavefront 24 in the refracted beam to P. The sign of a phase function will, by convention, be chosen so that the function increases in the beam's direction of propagation; hence $\Phi'$ will be negative in the vicinity of the lens surface. In terms of the geometric distances L and L' (see FIG. 7), the optical phase distances $\Phi|_P$ and $\Phi'|_P$ are defined as $$\Phi|_P = 2\pi \frac{L}{\lambda_o}, \quad (50)$$

$$\Phi'|_P = -2\pi \frac{L'}{\lambda_o'}$$

where $\lambda_o$ and $\lambda_o'$ are the wavelengths on the lens's incident and exit sides, respectively. (Equations (2) define $\lambda_o$ and $\lambda_o'$ in terms of the free-space wavelength $\lambda$ and the incident and exit optical media's respective refractive indexes $n_o$ and $n_o'$.) Both phase distributions are extended across the lens surface 22 to cover the spaces on both sides of the surface (as indicated by the dashed wavefronts in FIG. 7).

The phase distributions are nonunique to the extent that changing either distribution by adding a constant merely shifts the position of the reference wavefront without affecting the structure of the beam represented by the distribution. If the optical surface in FIG. 7 is a component of an optical system, the phase distributions $\Phi$ and $\Phi'$ may traverse other optical elements in the system, and the reference wavefronts may be located outside of the system. (In a region where the beam crosses itself, as in the space in front of a reflective surface, the phase distribution would be multiple-valued.) In general, the value of $\Phi$ or $\Phi'$ at a point P would be calculated by summing the optical phase lengths, along a ray section joining the reference wavefront and P, of the ray segments in the different optical media traversed by the ray. (If the ray intercepts a grating element, the calculation must also include the discontinuous phase jump that occurs at the point where the ray intercepts the grating. A method for calculating the phase discontinuity across a transmission grating will be outlined later.)

For any general point P located on the lens surface 22 in FIG. 7, the ray passing through P will traverse a total phase distance of $(\Phi - \Phi')|_P$ between the reference wavefronts 23 and 24 (where the notation "$(\Phi - \Phi')|_P$" indicates the value of the function $\Phi - \Phi'$ at point P.). According to the phase-matching principle, this phase distance should be the same for all ray segments joining the wavefronts, so the function $\Phi - \Phi'$ should be constant over the entire lens surface:

$$(\Phi - \Phi')|_P = C \text{ for any point P on the lens}, \quad (51)$$

where C is a fixed constant. Thus, the lens shape can be determined by specifying the location of any particular point $P_o$ on the lens surface and stipulating that the phase function $\Phi - \Phi'$ at any other surface point P should be equal to its value at $P_o$; i.e., the surface is defined by the relation $$(\Phi - \Phi')|_P = (\Phi - \Phi')|_{P_o} \tag{52}$$

for any point P on the lens.

The phase-matching principle can also be applied to the design of a diffraction grating. Again, the incident and diffracted beams are specified in terms of their design phase distributions $\Phi$ and $\Phi'$ (for a particular design wavelength) and we initially suppose that the grating's substrate geometry is also specified. (The "grating substrate" is an imaginary smooth surface tangent to the grating grooves. The surface is "smooth" in the sense that over any wavelength-scale region the surface is substantially flat.) As in the previously-discussed case of a uniform grating, the design is performed in two steps: First we partition the grating substrate into facet zones in such a way that the phase function $\Phi - \Phi'$ on each zone boundary is constant over the boundary and differs by $2\pi$ between adjacent boundaries. (For a uniform grating, this condition determines the grating period $\Lambda$.) The facet zone geometry determines the diffracted beam's geometry, and the specified zone structure generates the specified beam geometry in the primary diffracted order (which would be a 1st or $-$1st order $-$ an m$-$th or $-$m$-$th diffracted order of the specified geometry would be generated if the phase difference between adjacent zone boundaries were $2\pi m$.) Having defined the facet zone structure we then define the facet surface geometry by specifying that each zone boundary defines a border of a facet surface over which $\Phi - \Phi'$ is constant. (This condition defines the facet angle $\alpha$ for the uniform-grating case.) The facet surface shape determines the energy distribution between diffracted orders, and this specification maximizes efficiency in the primary order.

The grating design is illustrated in FIG. 8, which shows a magnified portion of the grating surface 25. We will define the grating substrate surface 26 by a relation of the form $$f|_P = 0 \text{ for any point P on the substrate,} \tag{53}$$

where f is a specified function of positional coordinates and $f|_P$ is its value at point P. The first step in the design is to partition the substrate into facet zones (e.g., zone 27 in FIG. 8). Each facet face 28 will intercept the substrate over one of the zone boundaries 29. The facet zones are defined by the condition that the phase function $\Phi - \Phi'$ is constant on each zone boundary and differs by $2\pi$ between adjacent boundaries; hence the value of $\Phi - \Phi'$ on each zone boundary will be $2\pi m + C$ where m is some integer associated with the boundary and C is a constant. The integer m may serve as an identifying index labeling the zone boundaries and associated intercepting facets, so the specification of the grating zone geometry can be stated $$f|_P = 0 \text{ and } (\Phi - \Phi')|_P = 2\pi m + C \tag{54}$$

for any point P on boundary m.
The two relations in (54) define two surfaces (as illustrated by the dashed lines in FIG. 8), the intersection of which defines boundary m. (Any arbitrary value may be chosen for C in the above specification.)

Each facet sidewall 30 (FIG. 8) would intercept a zone boundary 29 and may have a roughly straight profile transverse to the substrate. The detailed shape and orientation of the sidewalls may be be determined by practical considerations or may be optimized by a more refined optical analysis, but if the grating facet angle is small the sidewall geometry would have no significant influence on optical performance. The only general requirement that we will impose on the sidewall geometry is that its profile 30 should be very short in relation to the facet surface profile 28 (FIG. 8).

Each facet face 28 (FIG. 8) is bounded by two adjacent sidewalls, and the shape of facet m's surface between these bounds is defined by the phase-matching condition, $$(\Phi - \Phi')|_P = 2\pi m + C \text{ for any point P on facet face m.} \tag{55}$$

(The facet profile shape defined by (55) would generally be slightly curved due to the wavefront curvature in the incident and diffracted beams, but in order to simplify lens tooling an approximately equivalent straight profile tangent to the ideal design profile could perhaps be used, at least over the grating's high-frequency regions, without significantly compromising optical performance.)

The above design procedure defines a grating structure that diffracts the incident beam efficiently into an exit beam of the specified form for a particular design wavelength. (The grating zone structure defined by (54) determines the diffracted beam geometry, and the facet surface shape defined by (55) maximizes efficiency in the primary diffracted order.) If the grating's substrate shape is not predetermined, the extra degree of freedom would make it possible to design the zone structure to achieve achromatic imaging of at least two wavelengths. We will first consider how this can be accomplished for two very close wavelengths $\lambda_g$ and $\lambda_g + \delta\lambda$, where $\delta\lambda$ is an infintesimal quantity. The phase distributions $\Phi$ and $\Phi'$ will be defined as functions of wavelength over some spectral band containing $\lambda_g$. The incident phase function $\Phi$ may incorporate chromatic dispersion effects induced by elements preceding the grating, and the diffracted phase function $\Phi'$ may be defined to compensate for dispersion induced by elements following the grating; thus, the grating may compensate for dispersion induced by other optical elements as well as refraction-induced dispersion at the grating element itself.

Applying condition (54) at wavelength $\lambda_g$, we obtain $$f|_P = 0 \text{ and } (\Phi - \Phi')|_{P,\lambda_g} = 2\pi m + C|_{\lambda_g} \tag{56}$$

for any point P on boundary m.
where the "constant" term C may in the present context depend on wavelength. (The subscripts "P" and "$\lambda_g$" in (56) indicate the position P and wavelength $\lambda_g$ at which the functions are evaluated.) For wavelength $\lambda_g + \delta\lambda$ we also obtain the auxiliary condition $$(\Phi - \Phi')|_{P, \lambda_g + \delta\lambda} = 2\pi m + C|_{\lambda_g + \delta\lambda} \tag{57}$$

for any point P on boundary m.
Taking the difference of (57) and the second equation in (56), dividing by $\delta\lambda$, and taking the limit $\delta\lambda \to 0$, we obtain $$\left(\frac{\partial \Phi}{\partial \lambda} - \frac{\partial \Phi'}{\partial \lambda}\right)\bigg|_{P,\lambda_g} = \frac{dC}{d\lambda}\bigg|_{\lambda_g} \tag{58}$$

for any point P on boundary m.

Equation (58) will be consistent with (53) if we define the substrate's defining function f by $$f|_P = \left(\frac{\partial \Phi}{\partial \lambda} - \frac{\partial \Phi'}{\partial \lambda}\right)\bigg|_{P,\lambda_g} - \frac{dC}{d\lambda}\bigg|_{\lambda_g}. \tag{59}$$

The constant term $dC/d\lambda|_{\lambda_g}$ in (59) can be determined by specifying the location of any particular point $P_o$ on the substrate and stipulating condition (53) at this point.

Equation (59) then translates to $$f|_P = \left(\frac{\partial \Phi}{\partial \lambda} - \frac{\partial \Phi'}{\partial \lambda}\right)\bigg|_{P,\lambda_g} - \left(\frac{\partial \Phi}{\partial \lambda} - \frac{\partial \Phi'}{\partial \lambda}\right)\bigg|_{P_o,\lambda_g}. \tag{60}$$

With $P_o$ specified, the substrate geometry is defined by (53), the grating zone boundaries are defined by (56), and the facet shape in zone m may be defined by applying condition (55) at wavelength $\lambda_g$ in order to maximize diffraction efficiency at the design wavelength:

$$(\Phi - \Phi')|_{P,\lambda_g} = 2\pi m + C|_{\lambda_g} \tag{61}$$

for any point P on facet face m.
(Any value may be chosen for the constant term $C|_{\lambda_g}$ in (56) and (61).)

In optimizing the grating geometry for a wide spectral band, improved dispersion-compensating performance may be achieved by using two widely-separated design wavelengths $\lambda_r$ and $\lambda_b$. Applying the second of conditions (54) on the zone boundaries, we obtain the conditions $$(\Phi - \Phi')|_{P,\lambda_r} = 2\pi m + C|_{\lambda_r} \tag{62}$$

for any point P on boundary m
for wavelength $\lambda_r$, and $$(\Phi - \Phi')|_{P,\lambda_b} = 2\pi m + C|_{\lambda_b} \tag{63}$$

for any point P on boundary m
for wavelength $\lambda_b$, where $C|_{\lambda_r}$ and $C|_{\lambda_b}$ are distinct constants associated with wavelengths $\lambda_r$ and $\lambda_b$, respectively. Equations (62) and (63) will be consistent with (53) if we define the substrate's defining function f by $$f|_P = ((\Phi - \Phi')|_{P,\lambda_r} - (\Phi - \Phi')|_{P,\lambda_b}) - (C|_{\lambda_r} - C|_{\lambda_b}). \tag{64}$$

The constant term $(C|_{\lambda_r} - C|_{\lambda_b})$ in (64) can be determined by specifying the location of any particular point $P_o$ on the substrate and stipulating condition (53) at this point. f then translates to $$f|_P = ((\Phi - \Phi')|_{P,\lambda_r} - (\Phi - \Phi')|_{P,\lambda_b}) - \tag{65}$$
$$((\Phi - \Phi')|_{P_o,\lambda_r} - (\Phi - \Phi')|_{P_o,\lambda_b})$$

and the substrate geometry is defined by (53). With the above definition of f equations (62) and (63) become redundant, so the grating zone boundaries can be defined by the conjunction of equation (53) with either of conditions (62) or (63) (using any value for the constant term $C|_{\lambda_r}$ or $C|_{\lambda_b}$.)

To determine the grating's residual dispersion, we need to be able to calculate the diffracted beam's phase distribution $\Phi'$ for any general wavelength $\lambda$, given a specification of the grating structure and the incident phase distribution $\Phi$. The primary diffracted order's beam geometry is defined by the phase-matching condition, $$(\Phi - \Phi')|_{P,\lambda} = 2\pi m + C|_\lambda \tag{66}$$

for any point P on boundary m,
where C is an arbitrary function of wavelength. Equation (66) implicitly defines $\Phi'$ on the facet boundaries. (In order to maintain consistency between the phase distribution $\Phi'$ defined by (66) and its predefined values at wavelengths $\lambda_r$ and $\lambda_b$, the values of $C|\lambda$ for $\lambda = \lambda_r$ and $\lambda = \lambda_b$ should be consistent with the values $C|\lambda_r$ and $C|\lambda_b$ in (62) and (63).) $\Phi'$ can be defined over the entire substrate surface by smoothly interpolating between the facet boundaries. If the grating structure is defined by the two-wavelength dispersion compensation procedure described above, $\Phi'|_{P,\lambda}$ may be implicitly defined on the grating substrate by eliminating the $2\pi m$ term between (66) and either (62) or (63), and extending the resulting equivalence over the entire substrate. For example, using (62) we obtain $$(\Phi - \Phi')|_{P,\lambda} - C|\lambda = (\Phi - \Phi')|_{P,\lambda_r} - C|\lambda_r \tag{67}$$

for any point P on the substrate,
where $\Phi'|_{P,\lambda_r}$ is predetermined.

(In contrast to the case of a uniform grating, there is no precise mathematical criterion for identifying and distinguishing a 1st or −1st diffracted order in a general nonuniform grating's diffracted field; but over any small region of the substrate over which the local grating geometry is substantially uniform, the phase distribution $\Phi'$ defined above coincides with the primary order's phase. The process of "smoothly interpolating" $\Phi'$ between facet boundaries is imprecise only to the extent that the description of the local grating geometry as being "substantially" uniform is also imprecise. No ambiguity arises with this description if the facet profile dimensions are small in comparison to the grating's aperture dimension and the curvature radii of the substrate, facet boundaries, and incident wavefront.)

Once $\Phi'$ is determined on the grating substrate, its value can be readily obtained throughout the diffracted beam. Referring to FIG. 9, the direction of a diffracted ray 31 (of any particular wavelength $\lambda$) projecting from a point P on the substrate 32 is parallel to gradient vector $\nabla \Phi'$ at P. ("$\nabla$" is the gradient operator with respect to positional coordinates. The gradient vector $\nabla \Phi'$ is indicated as 33 in FIG. 9.) Since $\Phi'$ is determined over the entire substrate, the tangential projection 34 of $\nabla \Phi'$ on the substrate can be determined; and its normal projection 35 can then be determined from the condition that the magnitude k of $\nabla \Phi'|_{P,\lambda}$ is equal to $2\pi n/\lambda$, where n is the value of the refractive index in the medium into which the ray transmits:

$$|(\nabla \Phi'|_{P,\lambda})| = 2\pi n/\lambda. \tag{68}$$

The gradient vector $\nabla \Phi'$ at P is then obtained taking the vector sum of its tangential and normal projections. The direction of this vector determines the diffracted ray direction at P; and by ray tracing from P we can then determine the ray's complete trajectory through the optical system. The difference between the field's phase values at any two points along the ray is equal to the phase length of the ray segment joining the points; so given the value of $\Phi'$ at P, we can readily determine its value at any other point on the ray.

(The above procedure for calculating $\Phi'$ defines a general method for ray tracing through a grating. In analyzing beam transmission through a general grating element, the incident beam's phase distribution $\Phi$ can be extended past the grating by defining $\Phi = \Phi'$ in the diffracted beam. From (66) we see that $\Phi$ has a jump discontinuity of $-(2\pi m + C|\lambda)$ across a point P on zone boundary m; and the phase discontinuity at substrate points between zone boundaries can be determined by interpolation. The phase discontinuity across the substrate surface at a general substrate point P determines a relationship between the phase gradient vectors $\nabla\Phi$ on P's incident and exit sides, from which the relationship between the incident and diffracted rays' propagation directions can be determined.)

The above procedure for determining $\Phi'$ only requires a specification of the grating's zone structure—the facet profile shape only determines the diffraction efficiency in the primary order and need not be specified to determine the diffracted field's phase distribution. Once the zone structure is determined, we can define the facet profile geometry by choosing an appropriate blaze wavelength $\lambda_B$, defining the diffracted beam's phase distribution $\Phi'$ at this wavelength, and then defining the facet surface shape by applying the phase-matching condition (55):

$$(\Phi - \Phi')|_{P, \lambda_B} = 2\pi m + C|\lambda_B \tag{69}$$

for any point P on facet face m,
where the constant term $C|\lambda_B$ coincides with its value in (66) at $\lambda = \lambda_B$.

In applying the two-wavelength dispersion compensation procedure described above, the design wavelengths $\lambda_r$ and $\lambda_b$ would generally be iteratively adjusted to minimize the grating's residual dispersion over a specified spectral band, and the blaze wavelength $\lambda_B$ would then be adjusted to maximize some measure of the grating's band-averaged diffraction efficiency. (The uniform-grating diffraction efficiency formula (35) may be used to calculate the diffraction efficiency over any small-scale region on the grating.)

Since different parts of the grating may not exhibit optimum performance for exactly identical values of $\lambda_r$, $\lambda_b$, and $\lambda_B$, we may generalize the above design procedure somewhat by allowing the design wavelengths $\lambda_r$, $\lambda_b$, and $\lambda_B$ to be weakly-varying functions of aperture position, which may be independently optimized on different parts of the grating. In applying this generalization, the desired output phase distribution would be defined over the full wavelength range spanned by $\lambda_r$ and $\lambda_b$. However, the degrees of freedom available with a single grating element do not allow the output phase function to be predetermined at more than two wavelengths, so we must draw a distinction between the ideal output phase distribution, $\Phi'_{ideal}$, and the actual phase distribution, $\Phi'$. In lieu of (65) the substrate's defining function f would in general be defined by $$f|_P = ((\Phi - \Phi'_{ideal})|_{P,} (\lambda_r|P) - (\Phi - \Phi'_{ideal})|_{P,} (\lambda_b|P)) - \tag{70}$$

$$((\Phi - \Phi'_{ideal})|_{P_o,} (\lambda_r|P_o) - (\Phi - \Phi'_{ideal})|_{P_o,} (\lambda_b|P_o)),$$

where the positional dependence of $\lambda_r$ and $\lambda_b$ is explicitly represented. We may define the facet zone structure by a generalization of (62), $$(\Phi - \Phi'_{ideal})|P_{,}(\lambda_r|P) = 2\pi m + C_r \tag{71}$$

for any point P on boundary m,
where $C_r$ is a fixed constant. (We could replace the constant term $C|\lambda_r$ in (62) with a weakly-varying function of position of the form $C|(\lambda_r|P)$ where C is a smooth function of wavelength, but the extra degree of freedom gained with this generalization is already provided through the position-dependence of $\lambda_r$, so we simply substitute a constant $C_r$ for $C|\lambda_r$.) Once the substrate geometry and zone structure are defined, the diffracted beam's actual phase distribution $\Phi'$ is implicitly determined by (66). (Whereas the identity between the $\Phi'$ functions in (62) and (66) required that the term $C|\lambda_r$ in (62) and $C|\lambda$ in (66) be consistently defined, no such consistency is required between (71) and (66) since $\Phi'$ and $\Phi'_{ideal}$ are distinct.) The facet surface geometry may then be defined by a generalization of (69)

$$(\Phi - \Phi')|P_{,}(\lambda_B|P) = 2\pi m + C|(\lambda_B|P) \tag{72}$$

for any point P on facet face m.
(C may be an arbitrarily defined function of wavelength, but it should be defined consistently in (66) and (72).)

General Specification

The design procedures described above can be applied to design a grating element that functions within an optical system to minimize the system's chromatic dispersion, provided that the system's design configuration (excluding the grating itself) is already specified. In practice, more sophisticated design methods would generally need to be employed since the optical system's design configuration would not normally be predetermined, but would rather be simultaneously optimized along with the grating design. The design principles outlined above may, however, serve to specify a dispersion-compensating grating and distinguish it from other grating applications. For this purpose, we consider a dispersion-compensating grating that forms a component of an optical system whose design configuration is specified, and we use the design specification for any optical elements preceding or following the grating in specifying the grating element's form and function.

The grating is formed as a relief pattern on the surface of a refractive optical element. Here, a "refractive optical element" is a transmissive element that, in conjunction with the grating, performs a primary optical function distinct from the grating surface's secondary dispersion compensating function, wherein the primary function alone could be accomplished by substituting a conventional refractive surface for the grating surface. To clarify this functional distinction, we can define the following structural distinction between the grating and the refractive element on which it is formed (see FIG. 10): Considering a grating surface 36 that separates two optical media with refractive indexes $n_o$ and $n_o'$, we can define the grating as a thin-film element comprising the region of space between a substrate surface 37 in the index-$n_o$ medium and a substrate surface 38 in the index-$n_o'$ medium. The optical element on the grating's index-$n_o$ side can be regarded as a separate conventional refracting element whose surface is defined by the substrate contour 37. (The grating may be sandwiched between two such elements.) The refractive element can be thought of as being physically separated from the grating by a thin (i.e., zero-thickness) gap in which the refractive index is $n_o'$. A ray that impinges on the grating, say from the index-$n_o$ medium, will be deflected by two means, first by purely refractive means as it enters the index-$n_o'$ gap, and then by purely diffractive means as it traverses the grating into the index-$n_o'$ exit medium. Thus, the grating and the refractive element would, in combination, perform their primary optical function through both refraction and diffraction. (The grating would typically contribute only very marginally to their combined optical power, so the primary optical function alone could alternatively be achieved by eliminating the grating and slightly modifying the refractive element's surface geometry.) In addition to performing this primary function, the grating would also perform a secondary dispersion compensating function (e.g., balancing refraction-induced dispersion in the refractive element) via its own diffraction-induced dispersion.

In the above context we define the grating surface's secondary "dispersion compensating function" generally as reducing chromatic dispersion in the optical system's output beam to a level significantly lower than what would be attainable if the grating surface were replaced by an optimally-configured conventional refractive surface. This definition distinguishes the grating's primary and secondary functions even when the refractive element on which it is formed comprises part of a conventional achromatic doublet whose primary function includes chromatic dispersion mitigation (e.g., the doublet may function to provide sufficient degrees of freedom in the design to allow two-wavelength color correction, whereas the grating may function to provide sufficient additional degrees of freedom to achieve three-wavelength color correction).

The optical system would function to channel a specified spatially coherent polychromatic incident beam into an output beam that is also substantially spatially coherent (to the extent possible within the range of possible design variations). The input beam is "spatially coherent" in the sense that any particular point in the portion of the beam's path preceding the system's first optical surface is traversed by only one (polychromatic) ray. Each such point will consequently also intercept a single incident wavefront, and we will use one such wavefront as a reference in relation to which the input beam geometry will be defined.

In specifying the input beam as being spatially coherent, we do not exclude the possibility that the system may, under actual operating conditions, function to accept a spatially incoherent beam; but the system's dispersion-compensating mechanism will only be specified here in relation to a particular spatially coherent incident beam for which the system is intended to exhibit good dispersion-compensating performance. (For example, the dispersion properties of a system designed to focus direct sunlight may be characterized in relation to a perfectly collimated incident beam originating from a point at the center of the sun disk.)

A "polychromatic" beam comprises radiation of more than one wavelength within a designated design spectrum that may include as few as two wavelengths or may comprise a continuous band of wavelengths. Due to the effect of chromatic dispersion in the system, the beam's different chromatic components would generally diverge as the beam traverses the system, and the dispersion-compensating element functions to offset this effect in order to minimize chromatic dispersion in the output beam. In practice, the output beam will generally exhibit some residual dispersion, but we will describe the system in terms of a specified dispersionless (i.e., spatially coherent) polychromatic output beam into which the system would ideally channel the input beam if chromatic dispersion could be eliminated. (Chromatic dispersion in the output beam would serve no intended purpose, and the system's optical performance would be optimized if residual dispersion were absent in the output beam and the actual output beam conformed to the specified ideal beam geometry.) A particular wavefront following the system's last optical element will serve as a reference in relation to which the ideal output beam geometry will be defined.

The input beam will be specified in terms of its phase distribution $\Phi$, which is a function of positional coordinates and wavelength. For any particular wavelength $\lambda$ within the design spectrum, the set of points P satisfying the relation $\Phi|_{P,\lambda}=0$ defines a surface that coincides with the input reference wavefront. By stipulating that this relation defines a common wavefront for all wavelengths $\lambda$, we implicitly specify that the incident beam is spatially coherent. $\Phi$ will be defined throughout the region between the input reference wavefront and the grating surface. From a specification of the reference wavefront geometry, $\Phi$ can be determined at any point within this region by ray tracing from the wavefront into the optical system. The form of $\Phi$ in the vicinity the grating depends on the design specification for all optical surfaces preceding the grating, and their chromatic dispersion characteristics are accounted for in the wavelength dependence of $\Phi$.

The ideal output beam will be defined in terms of its phase distribution $\Phi'_{ideal}$. The set of points P satisfying the relation $\Phi'_{ideal}|_{P,\lambda}=0$ (for any wavelength $\lambda$ within the design spectrum) defines the output reference wavefront. By stipulating that this relation defines a common wavefront for all wavelengths $\lambda$, we implicitly specify that the output beam is (ideally) dispersionless. $\Phi'_{ideal}$ will be defined throughout the region between the grating surface and the output reference wavefront. From a specification of the reference wavefront geometry, $\Phi'_{ideal}$ can be determined at any point within this region by reverse ray tracing from the wavefront back into the optical system. The form of $\Phi'_{ideal}$ in the vicinity the grating depends on the configuration of all optical surfaces following the grating, and their chromatic dispersion characteristics are taken into account in the wavelength dependence of $\Phi'_{ideal}$.

The output beam actually generated by the system will be defined in terms of its phase distribution $\Phi'$, which is determined throughout the region between the grating surface and the output reference wavefront. $\Phi'$ can be calculated by ray tracing from the input beam through the grating.

The grating structure is specified by first defining the substrate geometry, then defining how the substrate is partitioned into facet zones, and then defining the facet surface geometry over each zone. The substrate and zone geometries are defined so that the grating diffracts the incident beam into a primary (1st or −1st) diffracted order that substantially matches the specified form of the output beam, and the facet surface geometry is determined to maximize diffraction efficiency in the primary order.

The substrate geometry has a form that is determined so that the phase function $\Phi - \Phi'_{ideal}$ can be represented over the substrate substantially as the sum of some smooth function $\Omega$ that depends only on position, and some function C that depends only on wavelength:

$$(\Phi - \Phi'_{ideal})|_{P,\lambda} \approx \Omega|_P + C|_\lambda \tag{73}$$

for any point P on the substrate
and any wavelength $\lambda$ in the design spectrum.

(The "$\approx$" sign in (73) and in other relations to follow means "substantially equal to", in a sense that will be discussed below.) Each zone boundary is defined as the locus of points P on the substrate over which $\Omega|_P$ is equal to $2\pi m$, where m is some integer that is associated with the boundary and may serve as an identifying index labeling the zone boundary:

$$\Omega|_P = 2\pi m \text{ for any point P on boundary m.} \tag{74}$$

Given a specification of the substrate's shape and zone structure, the diffracted beam's phase distribution $\Phi'$ is implicitly defined on the zone boundaries by relation (66), $$(\Phi - \Phi')|_{P,\lambda} = 2\pi m + C|_\lambda \tag{75}$$

for any point P on boundary m,
where the function C in (75) is chosen to correspond with the function C in (73). Interpolating between zone boundaries, $\Phi'$ is implicitly defined over the entire substrate by the relation $$(\Phi - \Phi')|_{P,\lambda} = \Omega|_P + C|_\lambda \tag{76}$$

for any point P on the substrate.

Taking the difference of relations (73) and (76), we see that the the specified grating structure generates a primary diffracted order whose phase error $(\Phi' - \Phi'_{ideal})$ substantially vanishes over the entire substrate:

$$(\Phi' - \Phi'_{ideal})|_{P,\lambda} \approx 0 \tag{77}$$

for any point P on the substrate
and any wavelength $\lambda$ in the design spectrum;
and consequently the phase error substantially vanishes throughout the diffracted beam.

If the grating substrate geometry could be chosen to satisfy condition (73) exactly, the diffracted beam's phase distribution $\Phi'$ would precisely match its ideal form $\Phi'_{ideal}$ and chromatic dispersion would be completely eliminated in the optical system's output beam. There would not generally be sufficient degrees of freedom available in the choice of substrate shape to satisfy this condition exactly, however, so the specific sense in which condition (73) is to be interpreted requires some clarification.

The substrate's design condition (73) can be equivalently stated by stipulating that the difference of the phase function $(\Phi - \Phi'_{ideal})$ between any two wavelengths $\lambda_1$ and $\lambda_2$ in the design spectrum is substantially independent of position P on the substrate:

$$(\Phi - \Phi'_{ideal})|_{P,\lambda_1} - (\Phi - \Phi'_{ideal})|_{P,\lambda_2} \approx C|_{\lambda_1} - C|_{\lambda_2} \tag{78}$$

for any point P on the substrate
and any wavelengths $\lambda_1$ and $\lambda_2$ in the design spectrum.

This follows directly from (73). It follows from (78) that the function $(\Phi - \Phi'_{ideal})|_{P,\lambda} - C|_\lambda$ is substantially independent of wavelength $\lambda$, and can hence be approximately equated to some function $\Omega$ that depends only on position P over the substrate:

$$(\Phi - \Phi'_{ideal})|_{P,\lambda} - C|_\lambda \approx \Omega|_P \tag{79}$$

for any point P on the substrate and
any wavelength $\lambda$ in the design spectrum;
thus condition (73) also follows from (78). (The function C in (78) can be determined by arbitrarily defining its value $C|_{\lambda_1}$ for any particular wavelength $\lambda_1$, and then determining from relation (78) its value $C|_{\lambda_2}$ for any other general wavelength $\lambda_2$.)

The substrate cannot generally be configured to satisfy relation (78) exactly, so the substrate shape would be chosen to minimize the positional sensitivity, over the substrate, of the expression on the left side of (78). One method by which expression (78)'s positional sensitivity can be minimized is to define the substrate by the condition that relation (78) should hold precisely for two particular wavelengths $\lambda_1$ and $\lambda_2$; for example, $\lambda_1 = \lambda_g$ and $\lambda_2 = \lambda_g + \partial\lambda$, where $\lambda_g$ is a chosen design wavelength and $\delta\lambda$ is an infintesimal quantity. (One of the constants $C|_{\lambda_1}$ or $C|_{\lambda_2}$ in (78) may be arbitrarily chosen, and the other may be chosen so that the substrate intercepts a specified point.) From this design condition we obtain equations (53) and (59); and with the zone structure defined as in (56) the phase error $(\Phi' - \Phi'_{ideal})|_{P,\lambda_g}$ and its derivative with respect to wavelength $\lambda$, $(\partial(\Phi - \Phi'_{ideal})/\partial\lambda)|_{P,\lambda_g}$, will vanish at any substrate point P. Hence, the diffracted beam's phase distribution $\Phi'$ will substantially match its ideal form $\Phi'_{ideal}$ within a narrow spectral band including $\lambda_g$; and in practice this design configuration would typically also exhibit good dispersion-compensating performance over a fairly broad spectral range. (If the optical system includes other dispersion-compensating elements, the substrate shape defined by (53) and (59) may also have the property that, at any substrate point P, the second and perhaps higher order derivatives, with respect to wavelength $\lambda$, of the function $(\Phi - \Phi')|_{P,\lambda} - C|_\lambda$ may vanish at $\lambda = \lambda_g$; consequently, with the zone structure defined by (56), the corresponding derivatives of the phase error $(\Phi' - \Phi'_{ideal})|_{P,\lambda}$ will also vanish at $\lambda = \lambda_g$, resulting in further improved broadband performance.)

For broadband applications, the substrate geometry may alternatively be defined by stipulating that relation (78) should hold for two widely separated design wavelengths $\lambda_1 = \lambda_r$ and $\lambda_2 = \lambda_b$. From this design condition we obtain equations (53) and (64); and with the zone structure defined as in (62) the phase error $(\Phi' - \Phi'_{ideal})|_{P,\lambda}$ will vanish at $\lambda = \lambda_r$ and at $\lambda = \lambda_b$ over the entire range of substrate points P. At intermediate and nearby wavelengths the phase error would generally be fairly minimal, resulting in good dispersion-compensating preformance over a broad spectral band. (If the optical system includes other dispersion-compensating elements, the substrate configuration defined by (53) and (64) may also have the property that, at any substrate point P, the function $(\Phi - \Phi')|_{P,\lambda} - C|_\lambda$ is idential at three or more design wavelengths including $\lambda_r$ and $\lambda_b$. With the zone structure defined by (62), the phase error $(\Phi' - \Phi'_{ideal})|_{P,\lambda}$ would then vanish at all of these design wavelengths, resulting in further improved broadband performance.)

Either of the above two design methods may be used to define the substrate geometry, or a more refined method may be used (e.g., we may define $\lambda_r$ and $\lambda_b$ as slowly-varying functions of position over the substrate, as in (70)). From a general geometric perspective, these design approaches minimize expression (78)'s positional sensitivity over the substrate surface by defining the substrate geometry so that, at any particular substrate point P, the substrate surface is approximately perpendicular to a space curve spanned by the gradient vector $\nabla(\Phi-\Phi'_{ideal})|_{P,\lambda}$ as $\lambda$ ranges over the design spectrum. (The gradient of the left-hand side of (78) is equal to the vector difference of two points on this space curve, and is hence approximately perpendicular to the substrate at point P; so the left-hand expression in (78) will exhibit minimal positional sensitivity over the substrate.)

Any reasonable design approach used to minimize expression (78)'s positional sensitivity over the substrate will result in a grating design that dramatically reduces the optical system's chromatic dispersion in relation to a system that uses a conventional refractive lens surface in place of the grating surface, so in specifying the most general form for the grating substrate geometry, the precise design method employed need not be explicitly defined. Significant reduction in chromatic dispersion will be achieved if the chosen substrate geometry has the characteristic that, for any wavelengths $\lambda_1$ and $\lambda_2$ in the design spectrum, the function $(\Phi-\Phi'_{ideal})|_{P,\lambda_1}-(\Phi-\Phi'_{ideal})|_{P,\lambda_2}$ in (78) is significantly less sensitive to position P over the substrate surface than it would be over an optimally-configured conventional refractive surface designed to replace the grating surface, so this general characteristic may serve to specify the range of allowable substrate geometries. (The function's degree of positional sensitivity over a surface can be quantified in terms of the magnitude of the tangential projection, onto the surface, of the function's gradient vector.) In stipulating that the function has sigificantly less positional sensitivity over the substrate than it would over a conventional refractive surface, it is to be understood that this comparision holds generally between any two points, one on the substrate and the other on the refractive surface, that are intercepted by a common incident ray (i.e., the tangential projection of the function's gradient vector onto the substrate at a substrate point P would be substantially smaller in magnitude than the gradient vector's tangential projection onto the conventional refractive surface at a surface point that is intercepted by the same incident ray that intercepts P). The comparision would not hold in general between two points that are intercepted by different rays. (For example, residual dispersion at the peripheral zones of a dispersion-compensated lens would generally exceed the dispersion produced over the axial zone of an uncompensated lens; hence, the function's positional sensitivity over peripheral regions of the grating substrate would typically exceed its sensitivity over axial regions of a conventional refractive surface.)

With the substrate geometry specified so that the left side of relation (78) exhibits minimal or only moderate positional sensitivity over the substrate, the function C on the right can be defined by arbitrarily choosing its value $C|_{\lambda_1}$ for any particular wavelength $\lambda_1$ and then defining its value $C|_{\lambda_2}$ for any other wavelength $\lambda_2$ so that condition (78) holds substantially. (The error in (78) may in practice be minimized by equating $C|_{\lambda_1}-C|_{\lambda_2}$ to the average or median value, over the substrate, of the left side of (78).)

The grating's zone structure is defined by equation (74), where the defining function $\Omega$ may be defined by stipulating relation (79) at some particular design wavelength $\lambda$. For example, substituting equation (79) in (74) with the design wavelength $\lambda_g$ substituted for $\lambda$, we obtain the second equation in (56); and substituting the design wavelength $\lambda_r$ for $\lambda$, we similarly obtain (62). (The design wavelength $\lambda_r$ may be a slowly-varying function of position over the substrate, as in (71).) Disregarding the specific design method used to define $\Omega$, it is evident from condition (78) that the left side of relation (79) will be substantially independent of position P over the substrate, and it will hence be possible to choose some wavelength-independent function $\Omega$ that substantially satisfies condition (79). Any such function $\Omega$ may be used in (74) to define the zone geometry. (The error in relation (79) originating from the wavelength dependence of the left side of the relation gives rise to residual chromatic dispersion in the optical system's beam, and this error may in practice be minimized by defining $\Omega|_P$ as the average or median value, over the design spectrum, of the left-hand expression in (79).)

Each zone boundary borders an adjacent facet face, the face bordered by boundary m being designated as "face m". Each facet face extends over a substrate zone between two adjacent zone boundaries, with face m being bordered on one side by boundary m and on the other side by a short-profile sidewall joining face m to an adjacent facet face. (The sidewall's profile dimension is very small in relation to the facet face profile.) The surface shape of face m is substantially of a form defined by equation (72), $$(\Phi-\Phi')|_{P,(\lambda_B|P)} \approx 2\pi m + C|_{(\lambda_B|P)} \qquad (80)$$

for any point P on facet face m, where $\lambda_B$ is the "blaze wavelength", which may in general be a weakly-varying function of aperture position. (The function is "weakly-varying" in the sense that it is substantially constant on any small region on the grating over which the grating zone structure is substantially uniform.) In practice the facet surface shape need not have the exact form defined by (80). For example, mold tooling operations may be simplified by using a straight-profile facet shape tangent to the slightly curved profile defined by (80); or the profile shape may deviate slightly from the form defined by (80) in order to achieve marginally improved diffraction efficiency over a broad spectral band.

In the application illustrated in FIG. 2, a dispersion-compensating grating would be formed on the surface of a Fresnel lens comprising large-scale Fresnel facets on which small-scale grating facets are superimposed.

A dispersion-compensating grating need not extend over the entire lens surface on which it is formed. Generally, a conventional refractive lens does not exhibit much chromatic dispersion near the lens axis, so a dispersion-compensating grating would typically only be required over the lens's peripheral zones.

I claim:

1. A dispersion-compensated Fresnel lens which accepts a polychromatic, dispersionless input beam having a specific wavefront form and transforms it into a polychromatic output beam substantially of a specific desired wavefront form with minimal dispersion, wherein:

at least one side of the lens comprises large-scale Fresnel lens facets which affect the form of the output beam through the effects of refraction;

at least a portion of one side of the lens comprises a plurality of dispersion-compensating gratings that function to mitigate the lens's chromatic dispersion;

each of said gratings is formed as a surface relief pattern comprising small-scale grating facets superimposed on a respective one of said large-scale lens facets, wherein the grating surface affects the form of the output beam through the combined effects of refraction and diffraction;

each of said gratings has a substrate shape and facet zone structure configured so that the lens exhibits significantly less dispersion than it would without the gratings; and each of said gratings has a Fresnel-type blazed facet structure which optimizes its first-order diffraction efficiency over a desired spectrum.

2. The dispersion compensated Fresnel lens of claim 1 wherein said plurality of dispersion-compensating gratings is confined to a peripheral portion of the lens.

* * * * *

UNITED STATES PATENT AND TRADEMARK OFFICE
CERTIFICATE OF CORRECTION

PATENT NO.  : 5,161,057
DATED       : November 3, 1992
INVENTOR(S) : Kenneth C. Johnson It is certified that error appears in the above-identified patent and that said Letters Patent is hereby corrected as shown below:

On title page, [76], please change the inventor's address to --Kenneth C. Johnson, 710 Nido Drive #114, Campbell, California 95008--.

Column 12, equation (42), should read as follows:
-- $n_o' \sin\phi' = n_o \sin\phi$.

Column 12, equation (43), should read as follows:
-- $n_o' \sin(\theta_t+\alpha) \cos\phi' = n_o \sin(\theta_0+\alpha) \cos\phi$.

Column 13, equation (46), should read as follows:
-- $n_o' \sin\theta_m' \cos\phi' = n_o \sin\theta_0 \cos\phi + m\lambda/\Lambda$.

Column 23, line 15, "2mm" should read --$2\pi m$--.

Signed and Sealed this

Twenty-third Day of November, 1993

Attest:

BRUCE LEHMAN

*Attesting Officer*        *Commissioner of Patents and Trademarks*